United States Patent
Yanagisawa et al.

(10) Patent No.: US 6,429,399 B2
(45) Date of Patent: Aug. 6, 2002

(54) DISCHARGE TUBE FOR A LOCAL ETCHING APPARATUS AND A LOCAL ETCHING APPARATUS USING THE DISCHARGE TUBE

(75) Inventors: Michihiko Yanagisawa, Sagamihara; Tadayoshi Okuya, Yokohama, both of (JP)

(73) Assignee: SPEEDFAM Co., Ltd., Ayase (JP)

( * ) Notice: Subject to any disclaimer, the term of this patent is extended or adjusted under 35 U.S.C. 154(b) by 0 days.

(21) Appl. No.: 09/790,881

(22) Filed: Feb. 23, 2001

(30) Foreign Application Priority Data

Mar. 1, 2000 (JP) .......................................... 2000-056377

(51) Int. Cl.[7] .............................................. B23K 10/00
(52) U.S. Cl. .............................. 219/121.4; 219/121.43; 219/690; 204/298.38; 156/345
(58) Field of Search ...................... 219/121.52, 121.43, 219/121.51, 121.36, 121.4, 690, 696, 745; 315/39; 204/298.38, 298.37; 117/723 MW; 156/345

(56) References Cited

U.S. PATENT DOCUMENTS 4,065,369 A * 12/1977 Ogawa et al. .............. 204/164
4,207,452 A * 6/1980 Arai ............................ 315/39
4,933,650 A * 6/1990 Okamoto ..................... 315/39
6,303,511 B2 * 10/2001 Yanigisawa et al. ........ 438/710

* cited by examiner

Primary Examiner—Mark Paschall
(74) Attorney, Agent, or Firm—Morrison & Foerster, LLP

(57) ABSTRACT

A discharge tube for a local etching apparatus has a portion positioned within a waveguide which is for the generation of plasma, the said portion being tapered so as to be divergent toward an orifice side of the discharge tube. Even in the event a maximum field strength position of a standing wave in the waveguide should be deviated due to a change in microwave transmission characteristic of the material of the discharge tube or a change in the position of a plunger under the influence of heat, the maximum field strength position lies somewhere in the vicinity of a wall surface of the tapered portion, so that a supplied gas is converted to plasma stably in a short time. When the discharge tube is to be cooled, the cooling can be done effectively with a cooling gas which is cooled by adiabatic expansion while passing through the tapered portion.

7 Claims, 6 Drawing Sheets

DISCHARGE TUBE FOR A LOCAL ETCHING APPARATUS AND A LOCAL ETCHING APPARATUS USING THE DISCHARGE TUBE

This application is based on patent application No. 2000-056377 filed in Japan, the contents of which are hereby incorporated by reference.

BACKGROUND OF THE INVENTION

1. Field of the Invention

The present invention relates to a discharge tube for a local etching apparatus and a local etching apparatus using the discharge tube.

2. Description of the Related Arts

FIG. 8 is a schematic sectional view showing an example of a conventional local etching apparatus. This local etching apparatus has a discharge tube 100, a gas supply unit 110, a microwave oscillator 121, and a stage 130.

According to this construction, gas is fed from the gas supply unit 110 to the discharge tube 100, while from the microwave oscillator 121 is generated a microwave M into a waveguide 122 to convert the gas present in the discharge tube 100 into plasma and an active species G contained in the plasma is jetted from an orifice 101 of the discharge tube 100 onto a silicon wafer W placed on the stage 130.

Then, by moving the stage 130 horizontally, a surface portion (hereinafter referred to as the "relatively thick portion") Wa which is thicker than a specified surface thickness of the silicon wafer W is conducted to a position just under the orifice 101 of the discharge tube 100 and the active species G is jetted to the relatively thick portion Wa from the orifice 101 to etch the relatively thick portion Wa locally. The entire surface of the silicon wafer W is thus etched locally, whereby the surface thickness distribution of the silicon wafer W is rendered uniform and the entire surface of the wafer is made flat.

The conventional discharge tube 100 used in the above local etching apparatus has such a cylindrical structure: as shown in FIG. 9, which has a constant wall thickness and has a constant inside diameter corresponding to about a quarter of the wavelength of the microwave M.

The microwave M emitted from the microwave oscillaitor 121 is reflected by a plunger 123. A standing wave of the microwave M is formed by adjusting the position of the plunger 123. In this case, positioning is made so that a maximum field strength position M1 lies near an inner wall 100a of the discharge tube 100 and the gas contained in the discharge tube 100 is discharged at the portion of the maximum field strength position M1 to produce plasma.

However, the conventional discharge tube 100 has involved the following problem.

When the plasma is ignited with the energy at the maximum strength position Ml of the standing wave, the microwave transmission characteristic of the discharge tube 100 changes due to absorption of a radiant heat from the plasma and of the microwave M and, as indicated with a solid line and a broken line in FIG. 10, the maximum field strength position M1 of the microwave M shifts to the right or left from its initial position, resulting in the plasma blinking and being not stable. Further, the plunger 123, which is metallic, undergoes a thermal expansion and the distance between the plunger 123 and the discharge tube 100 changes. This sometimes results in that the plasma once produced vanishes suddenly after several minutes.

The conventional cylindrical discharge tube cannot cope with such a change in the maximum field strength position M1 of the microwave M which is produced in the initial stage of plasma formation, and the plasma blinks repeatedly. Thus, a long time is required until the plasma becomes stable and there occurs a phenomenon such that even if the plasma once becomes stable, it later vanishes. This causes a decrease in the number of workpieces treated per unit time, i.e., throughput, and a lowering of yield. Therefore, it has so far been keenly desired to remedy this point.

SUMMARY OF THE INVENTION

The present invention improves the above prior art and it is an object of the invention to provide a discharge tube for a local etching apparatus capable of producing a stable plasma in a short time in response to a variation of a standing wave of the microwave M which occurs at the beginning of or after plasma formation, capable of maintaining the stability of the plasma and thereby capable of improving the throughput and yield of workpieces, as well as a local etching apparatus using the discharge tube.

The discharge tube according to the present invention is for a local etching apparatus wherein a microwave emitted from a microwave oscillator into a waveguide is reflected by a plunger to produce a standing wave of the microwave, the discharge tube is positioned within the standing wave, allowing gas contained in the discharge tube to be converted to plasma, and then an active species contained in the plasma is jetted to a workpiece from an orifice of the discharge tube to etch the workpiece locally. A discharge portion of the discharge tube positioned within the waveguide is formed in a tapered shape which is divergent toward the orifice side of the discharge tube.

In this construction, the discharge tube is inserted through the waveguide and its discharge portion is positioned within the waveguide. Thereafter, a predetermined gas is fed into the discharge tube and the plunger is adjusted so that the portion corresponding to the maximum field strength of the standing wave is position near the inner wall of the discharge tube. In this state, a microwave is emitted from the microwave oscillator into the waveguide, where by a standing wave of the microwave is generated. In the case where the portion corresponding to the maximum field strength position of the standing wave is positioned near the inner wall of the discharge tube, the gases discharge into plasma. As a result, an active species contained in the plasma is jetted from the orifice of the discharge tube to the surface of the workpiece, whereby the workpiece is etched locally.

Even if the maximum field strength position of, the standing wave deviates from an initial set position, part of the maximum field strength position always lies near the inner wall of the discharge tube because in the discharge tube of the invention the discharge portion positioned in the waveguide is tapered so as to expand toward the orifice side. Thus, there is no fear of plasma blinking suddenly after ignition or vanishing after becoming stable. Not only a stable plasma can be obtained in a short time, but also the plasma can be kept stable.

A taper angle θ between the wall of the discharge portion of the discharge tube and the axis of the same tube may be set in the range of 1° to 10°. The material of the discharge tube may be any of quartz, aluminum oxide, and aluminum nitride.

The local etching apparatus according to the present invention comprises a microwave oscillator for generating a microwave, a waveguide for propagation therethrough of the microwave generated from the microwave oscillator, a plunger for reflecting the microwave propagated through the waveguide to generate a standing wave and for positioning a portion corresponding to a maximum field strength position of the standing wave at a predetermined position, a tapered discharge tube inserted through the waveguide and having a discharge portion positioned within the waveguide, the discharge portion being tapered so as to be divergent toward the orifice side from which the active species is jetted, and a workpiece scanning means which causes the orifice of the discharge tube to scan relatively on the surface of the workpiece opposed to the orifice.

The local etching apparatus may be further provided with cooling means for cooling the discharge tube by passing a cooling gas from a small-diameter side toward a large-diameter side of the tapered portion on an outer or inner surface of the discharge tube. The cooling gas is air or nitrogen and is flowed at a flow rate in the range from 30 to 90 λ/m.

The local etching apparatus may be further provided with etching area limiting means which forms a gaseous atmosphere held at a predetermined pressure so as to surround the active species jetted from the orifice of the discharge tube toward the workpiece to prevent diffusion of the active species and which thereby limit the workpiece etching area by the active species to a smaller area than the area of the workpiece.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and together with the description, serve to explain the principles of the invention.

FIGS. 5(a) to 5(c) are schematic sectional views showing maximum field strength positions of a microwave, in which FIG. 5(a) shows a maximum field strength position in initial setting, FIG. 5(b) shows a maximum field strength position shifted to an inner side of the quartz discharge tube, and FIG. 5(c) shows a maximum strength position shifted to an outer side of the quartz discharge tube;

DESCRIPTION OF THE PREFERRED EMBODIMENT

An embodiment of the present invention will be described hereinunder with reference to the accompanying drawings.

Figure 1:
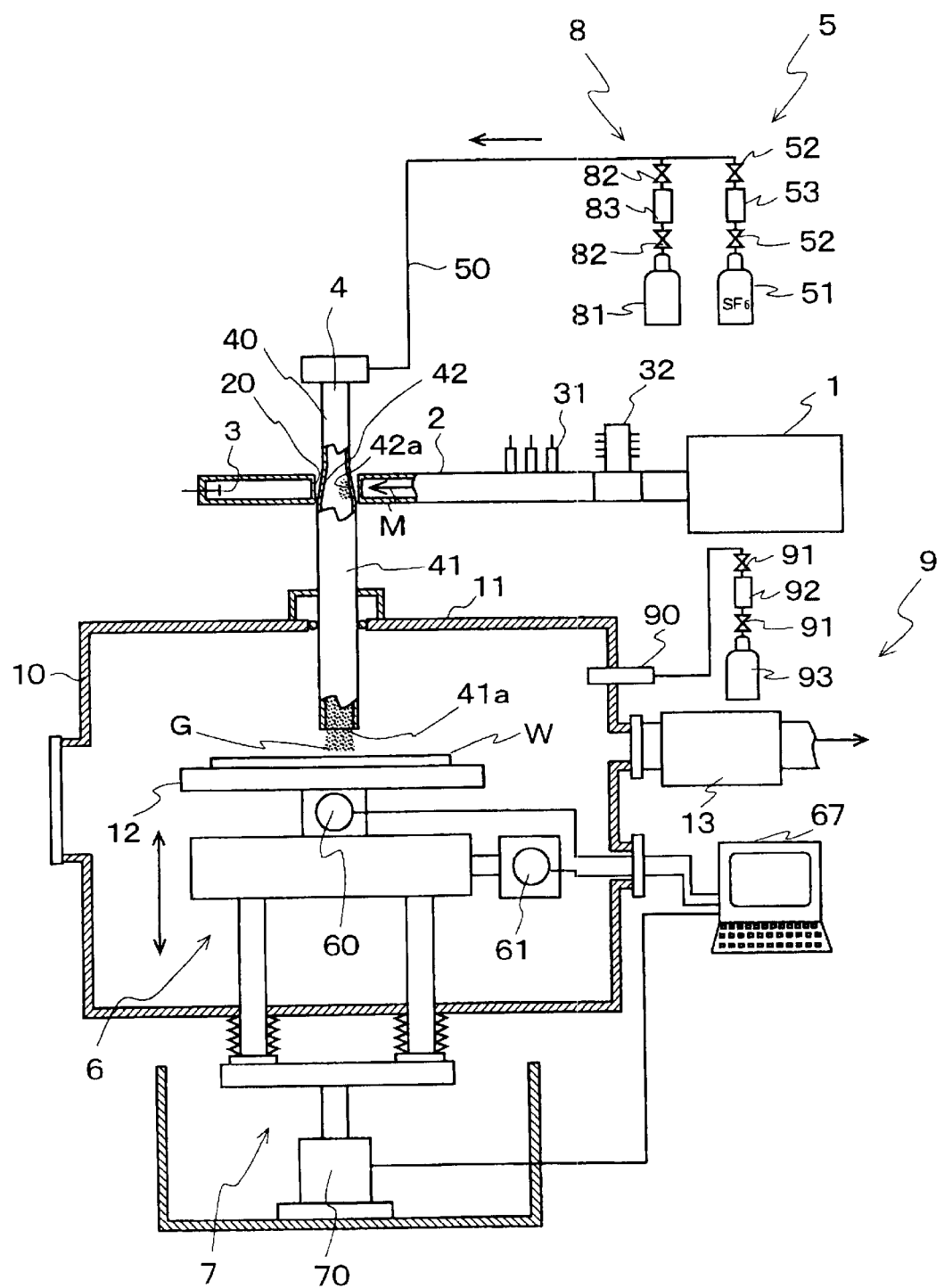
FIG. 1 is a partially cut-away, schematic configuration diagram showing a local etching apparatus according to an embodiment of the present invention.

FIG. 1 is a partially cut-away, schematic configuration diagram showing a local etching apparatus according to an embodiment of the present invention. As shown in the same figure, the local etching apparatus, which uses a tapered discharge tube, is provided with a microwave oscillator 1, a waveguide 2, a plunger 3, a quartz discharge tube 4 as the tapered discharge tube, a gas supply unit 5, an X-Y drive mechanism 6 as work scanning means, a Z-drive mechanism 7, a cooling unit 8 as cooling means, and an etching area limiting unit 9 as etching area limiting means.

The microwave oscillator 1, which is magnetron, can generate a microwave M from an output end thereof.

The waveguide 2 is connected to the output end of the microwave oscillator 1. The waveguide 2 is a tubular member for propagating the microwave M from the microwave oscillator 1 toward the plunger 3, with a hole 20 for insertion therein of the quartz discharge tube 4 being formed in a predetermined position of the waveguide 2. A stab tuner 31 for impedance-matching the microwave M and an isolator 32 for bending a reflected microwave M in a 90° direction (the surface direction in FIG. 1) which microwave is traveling toward the microwave oscillator 1, to prevent the reflected microwave from returning to the microwave oscillator 1.

The plunger 3 functions to reflect the microwave M propagated through the waveguide 2 and generate a standing wave of the microwave. It is mounted to the left end of the waveguide 2 so as to be slidable right and left in FIG. 1. A portion corresponding to a maximum field strength position of the standing wave of the microwave M can be set at a predetermined position by changing the position of the plunger 3.

The quartz discharge tube 4 contains gas for conversion to plasma using the microwave M and ejects an active species contained in the plasma from an orifice 41a thereof. The discharge tube 4 is inserted through the waveguide 2.

Figure 2:
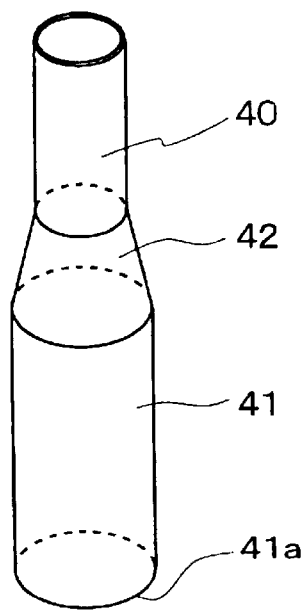
FIG. 2 is a perspective view of a quartz discharge tube.
Figure 3:
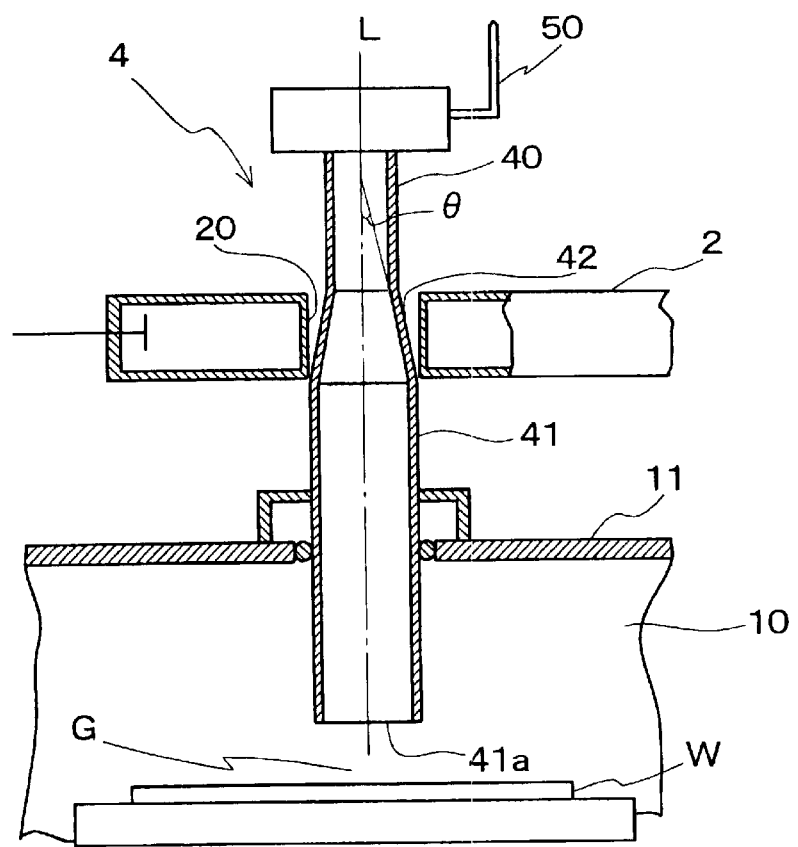
FIG. 3 is a partially enlarged sectional view showing a mounted state of the quartz discharge tube.

FIG. 2 is a perspective view showing the quartz discharge tube 4 and FIG. 3 is a partially enlarged sectional view showing a mounted state of the quartz discharge tube. As shown in FIG. 2, the quartz discharge tube 4 is made up of a small-diameter portion 40 for introducing gas from the gas supply unit 5 (see FIG. 1) into the discharge tube, a large-diameter portion 41 having the orifice 41a for jetting the active species G, and a discharge portion 42 (discharge site) which provides a connection between the small- and large-diameter portions 40, 41. The discharge portion 42, which is for converting the internal gas into plasma, is tapered so as to expand toward the orifice 41 aside of the large-diameter portion 41. More specifically, as shown in FIG. 3, a taper angle θ between an inner wall surface 42a of the discharge portion 42 and an axis L of the discharge tube is set at a value in the range of 1° to 10°.

The large-diameter portion 41 is inserted into a chamber 10 and the discharge portion 42 is positioned within the hole 20 of the waveguide 2. In this state the quartz discharge tube 4 is fixed to a ceiling side 11 of the chamber 10. A feed pipe 50 from the gas supply unit 5 is connected to an upper end of the quartz discharge tube 4.

In FIG. 1, the gas supply unit 5 is for the supply of gas into the quartz discharge tube 4 and has a cylinder 51 for $SF_6$ (sulfur hexafluoride) gas. The cylinder 51 is connected to the feed pipe 50 through a valve 52 and a flow rate controller 53.

Once a silicon wafer W as a workpiece is put on a chuck 12, it is chucked with an electrostatic force of the chuck. A vacuum pump 13 is attached to the chamber 10 so that a vacuum can be formed within the chamber 10.

The X-Y drive mechanism 6 is disposed within the chamber 10 and bears the chuck 12 from below. The X-Y drive mechanism 6 has an X-drive motor 60 for moving the chuck 12 right and left in FIG. 1 and a Y-drive motor 61 for moving both chuck 12a and X-drive motor 60 together in the paper surface and back direction in FIG. 1. Thus, with the X-Y drive mechanism 6, the orifice 41a of the quartz discharge tube 4 can be relatively moved in Y-Y directions with respect to the surface of the silicon wafer W.

The Z drive mechanism 7 supports from below the whole of the X-Y drive mechanism 6 within the chamber 6. The whole of the X-Y drive mechanism 6 is moved vertically by means of a Z-drive motor 70 provided in the Z-drive mechanism 7, whereby the distance between the orifice 41a which faces the silicon wafer W and the surface of the silicon wafer can be adjusted.

The operation of the X- and Y-drive motors 60, 61 in the X-Y drive mechanism 6 and that of the Z-drive motor 70 in the Z-drive mechanism 7 are controlled by a control computer 67 in accordance with a predetermined program.

The cooling unit 8, which is for cooling the quartz discharge tube 4, is provided with a cylinder 81 for a cooling gas, e.g., air, the cylinder 81 being connected to the feed pipe 50 through a flow rate controller 83.

The etching area limiting unit 9 creates a gaseous atmosphere held at a predetermined pressure around the active species G which is jetted from the orifice 41a of the quartz discharge tube 4 toward the silicon wafer W, to prevent diffusion of the active species G and thereby limit the etching area for the wafer by the active species to a smaller area than the area of the wafer. The etching area limiting unit 9 is made up of a nozzle 90 which is attached to the chamber 10 with an orifice thereof facing the interior of the chamber and an $N_2$ (nitrogen gas) cylinder 93 to which the nozzle 90 is connected through a valve 91 and a flow rate controller 92.

Figure 4:
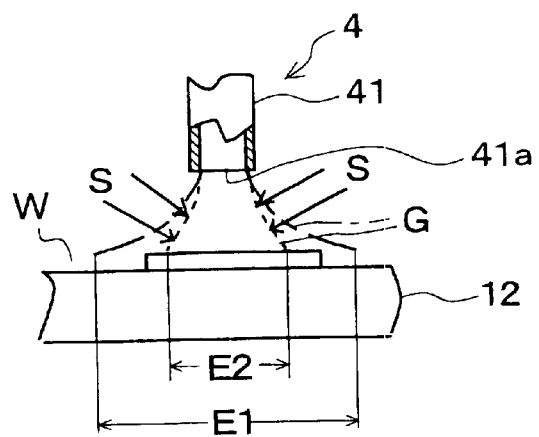
FIG. 4 is a schematic diagram showing an etching area limiting action effected by an etching-area limiting unit.

When the internal pressure of the chamber 10 is close to a vacuum, as indicated with a dot-dash line in FIG. 4, the flux density of the active species G flares downward and an etching area E1 for the silicon wafer W becomes larger than the wafer. In this case, by supplying nitrogen gas ($N_2$), indicated at S, into the chamber 10 and allowing the flux density of the active species G to be throttled with the pressure of the nitrogen gas S, an etching area E2 of F radical R for the silicon wafer W can be made smaller than the area of the wafer.

Next, the operation of the local etching apparatus according to this embodiment will be described below. First, the vacuum pump 13 shown in FIG. 1 is operated to adjust the internal pressure of the chamber 10 into a predetermined low pressure. At the same time, the whole of the X-Y drive mechanism 6 is raised by moving the Z drive mechanism 7, causing the silicon wafer W to approach the orifice 41a.

Then, the valve 52 in the gas supply unit 5 is opened, allowing $SF_6$ gas contained in the cylinder 51 to be fed into the quartz discharge tube 4 through the feed pipe 50. At this time, the flow rate of the $SF_6$ gas is adjusted to a desired value by adjusting the degree of opening of the valve 52 and the flow rate controller 53.

Thereafter, the microwave oscillator 1 is operated to emit the microwave M into the waveguide 2. As a result, the microwave M, which is propagated through the waveguide 2, passes through the discharge portion 42 of the quartz discharge tube 4 and is then reflected by the plunger 3., whereupon the plunger is adjusted to generate a standing wave of the microwave M. It is known that the ignition of plasma takes place when a portion corresponding to a maximum field strength position of the standing wave is positioned near the inner wall surface 42a of the discharge portion 42. Therefore, the adjustment of the plunger 3 is made so that the maximum field strength position of the standing wave lies near the inner wall surface 42a.

Figure 5A:
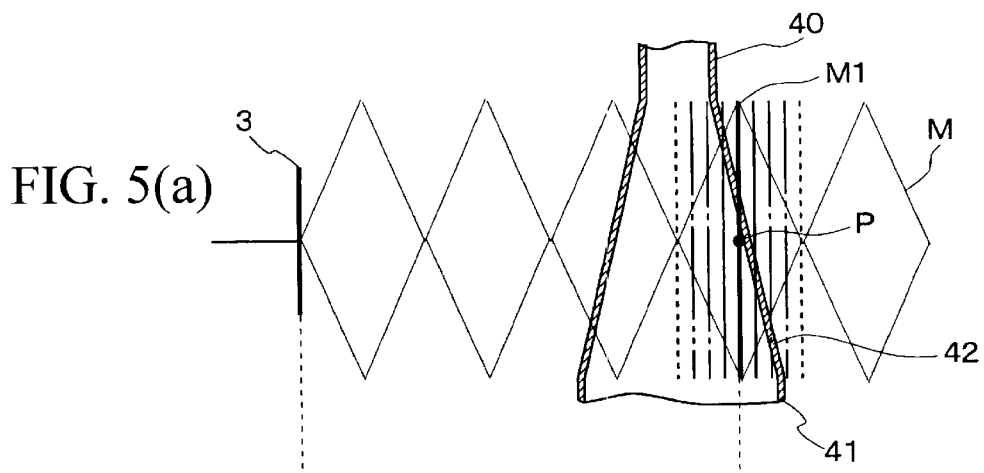
Figure 5B:
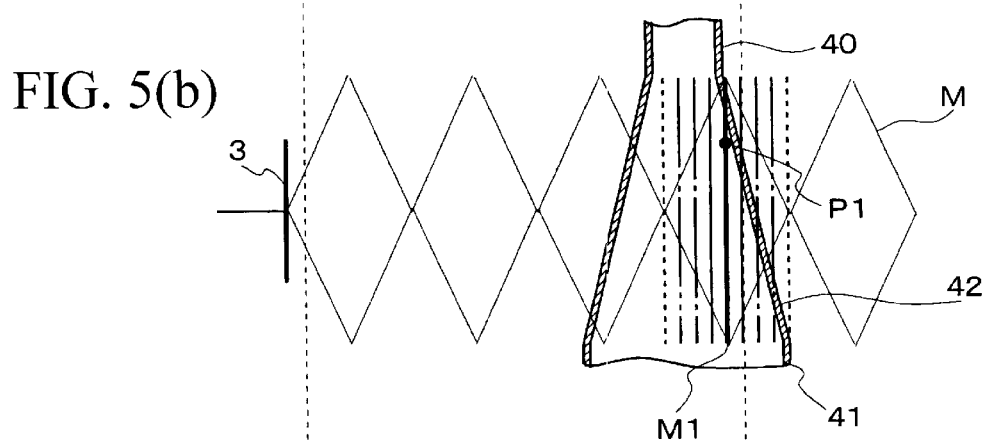
Figure 5C:
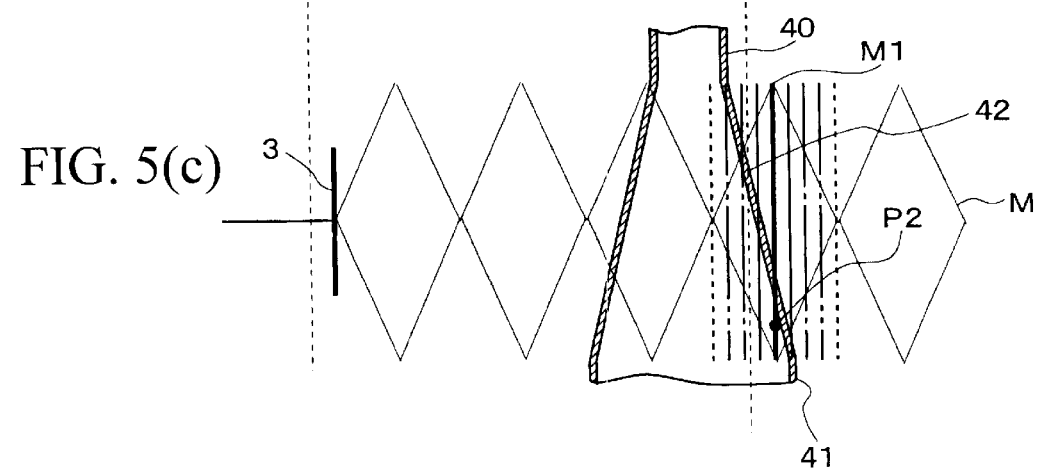

FIGS. 5(a) to 5(c) are schematic sectional views showing maximum field strength positions of the microwave M, in which FIG. 5(a) shows a maximum field strength position in initial setting, FIG. 5(b) shows a maximum field strength position deviated to the inner side of the quartz discharge tube 4, and FIG. 5(c) shows a maximum field strength position deviated to the outer side of the quartz discharge tube.

In FIGS. 5(a) to 5 (b), the reference mark M1 stands for a maximum field strength position of the microwave M. The microwave M is a plane wave, so if the planes of various portions facing in the wave traveling direction are seen from the surface side in the figure, field strengths of the various portions can be represented in terms of different types of lines. More particularly, the field strength of the maximum field strength position M1 is the highest and the field strength becomes smaller as the distance from the position Ml becomes longer, so the plane at the position Ml is indicated with a thick solid line, and the planes of various portions present on both sides of the maximum field strength position M1 are indicated with a fine solid line, a dash-dot line, a dash-double dot line, and a broken line, respectively, showing gradually weaker field strengths in this order.

In initial setting, as shown in FIG. 5(a), the plunger 3 is adjusted so that the maximum field strength position M1 lies centrally of the discharge portion 42. As a result, a central point P of the maximum field strength position M1 becomes very close to the inner wall 42a of the discharge portion 42 and $SF_6$ gas is ignited into plasma by the electric field at point P. Thus, as long as the maximum field strength position M1 is held at the initial setting position, the formation of plasma is continued and it is possible to obtain a stable plasma in a short time.

Even in the event the maximum field strength position M1 should deviate from its initial setting position due to a change in the microwave transmission characteristic of the quartz discharge tube 4 or expansion of the plunger 3 caused by a high heat resulting from plasma formation, the maximum field strength position M1 lies somewhere near the inner wall surface 42a because the discharge portion 42 of the quartz discharge tube 4 is formed in a tapered shape which expands toward the orifice 41a of the large-diameter portion 41.

To be more specific, if the maximum field strength position M1 shifts to inner side of the discharge tube 4, as shown in FIG. 5(b), the formation of plasma is maintained by the field strength of point P1 which lies at an upper position of and close to the inner wall surface 42a. Conversely, if the maximum field strength position M1 shifts to the outer side of the discharge tube 4, as shown in FIG. 5(c), the formation of plasma is maintained by the field strength of point P2 which lies at a lower position of and close to the inner wall surface 42a.

Thus, after the conversion to plasma of $SF_6$ gas, even if the maximum field strength position MI of the microwave M shifts to the inner or outer side of the quartz discharge tube 4, as shown in FIG. 5(b) or FIG. 5(c), the ignited state is maintained without blinking of plasma, and the plasma becomes stable in a short time. After the plasma has become stable, even if the maximum field strength position M1 shift's to the outer side of the quartz discharge tube 4, as shown in FIG. 5(c), the stable state of plasma is ensured.

As noted above, by converting $SF_6$ gas into plasma with the microwave M there is produced an active species G which contains F (fluorine) radical. As shown in FIG. 1, the active species G is conducted to the orifice 41a of the quartz discharge tube 4 and is jetted from the orifice 41a to the silicon wafer W side.

Thereafter, the pressure of nitrogen gas ($N_2$) to be jetted from the nozzle 90 in the etching area limiting unit 9 into the chamber 10 is controlled by the flow rate controller 92 so as to be in a proportion of 40% to 80% of the internal gas pressure of the quartz discharge tube 4. In this way the flux density of the active species G is throttled and the etching area for the silicon wafer W is limited to a smaller etching area than the area of the wafer.

In this state a local etching scan is performed for the silicon wafer W. More specifically, the X-Y drive mechanism 6 is operated by the control computer 67, causing the chuck 12 with the silicon wafer W chucked thereon to move in a zigzag fashion in X-Y directions.

Figure 6:
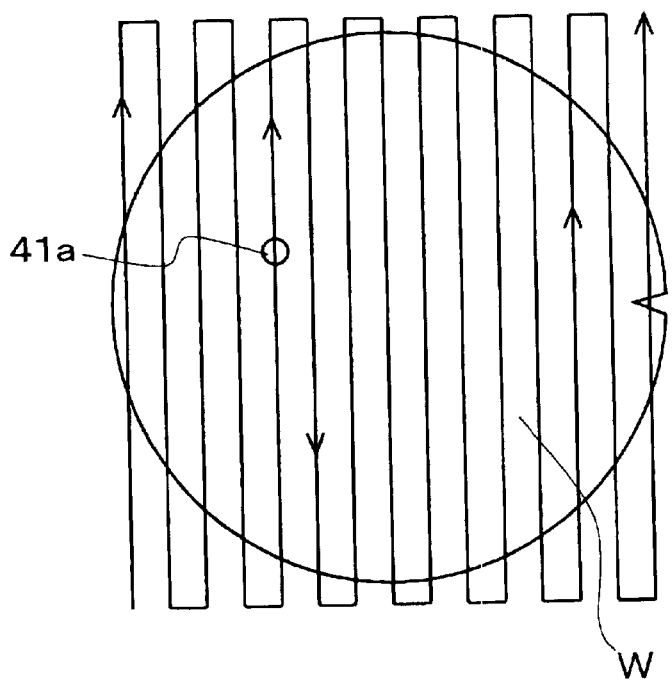
FIG. 6 is a plan view showing in what state a silicon wafer is scanned.
Figure 7:
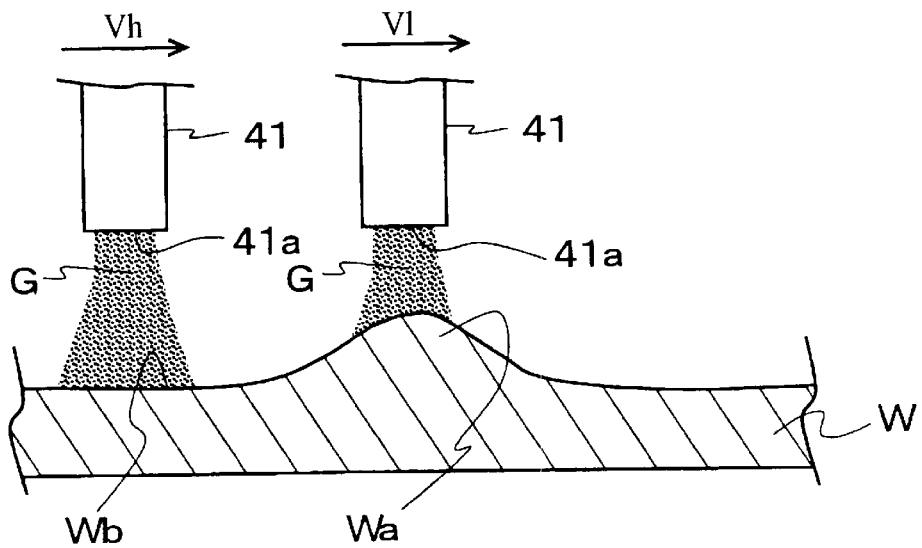
FIG. 7 is a sectional view showing a local etching operation.
Figure 8:
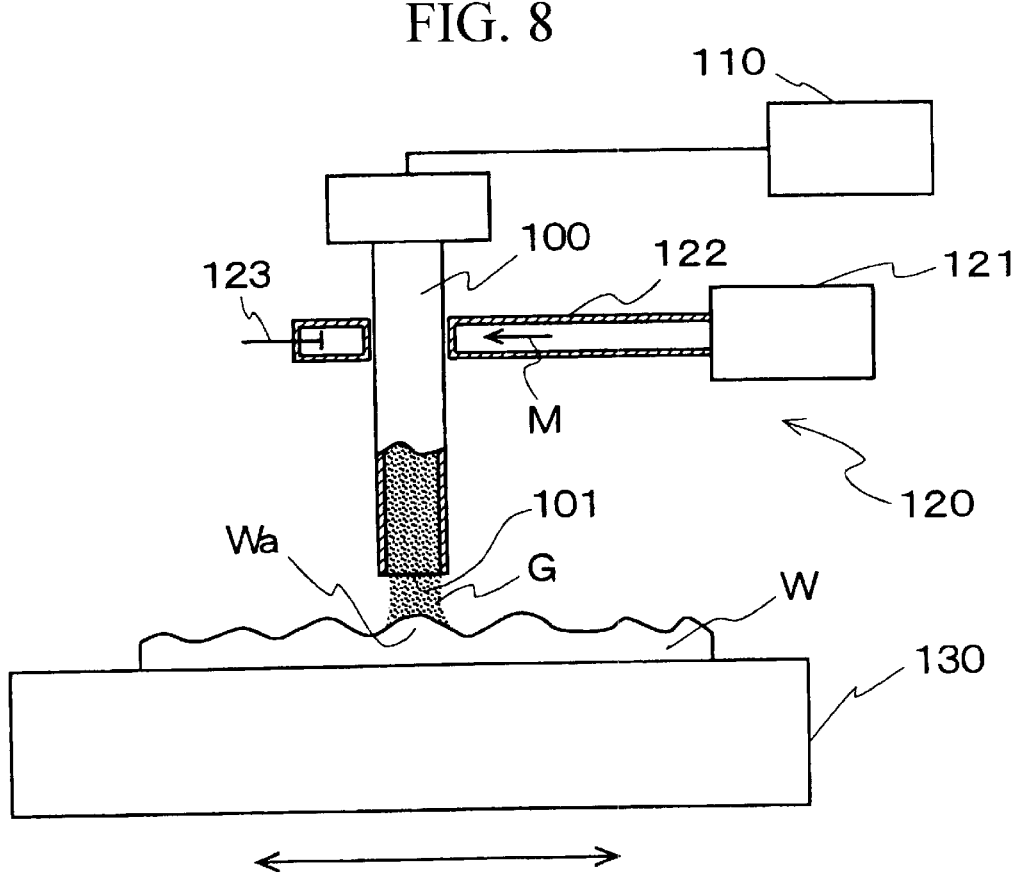
FIG. 8 is a schematic sectional view showing an example of a conventional local etching apparatus.
Figure 9:
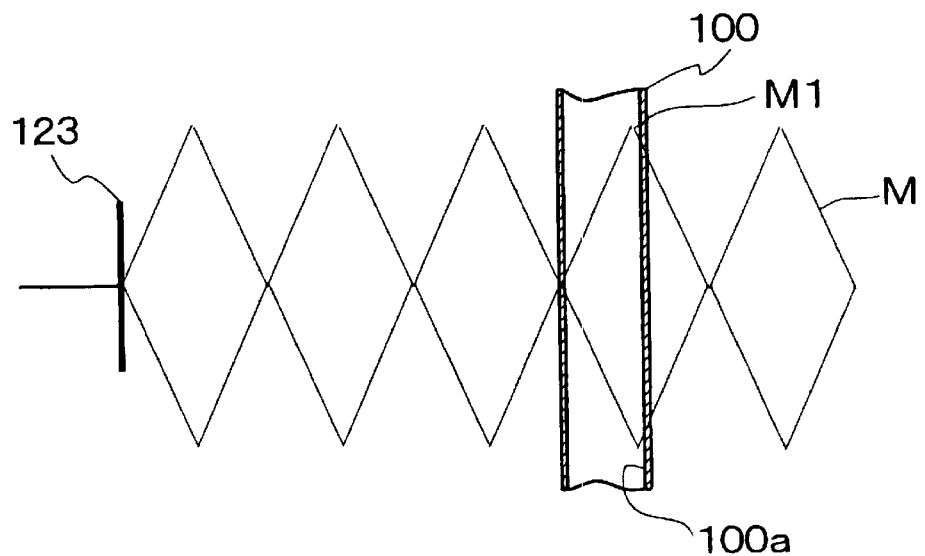
FIG. 9 is a sectional view showing a conventional discharge tube.
Figure 10:
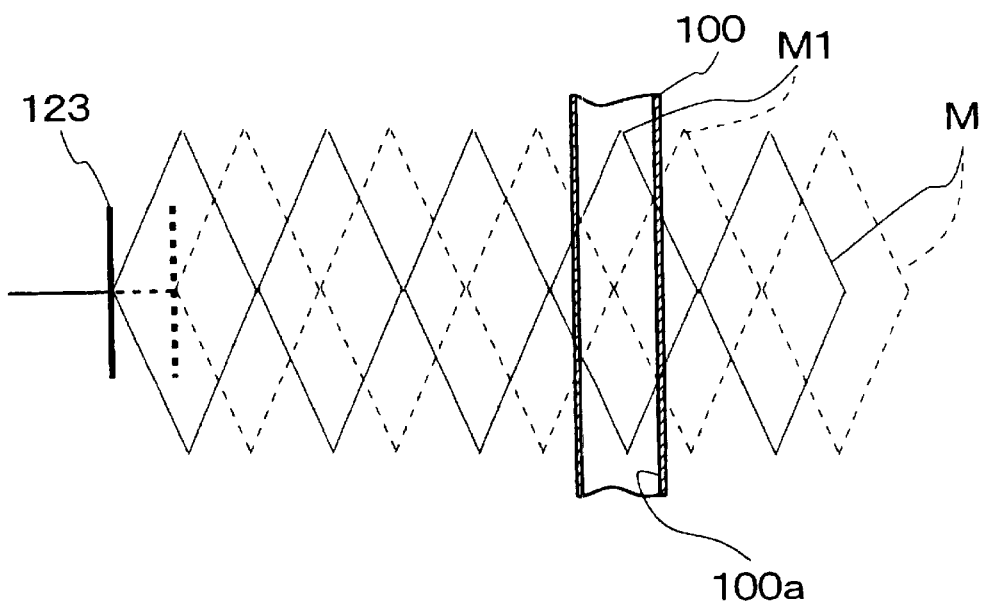
FIG. 10 is a sectional view showing a deviated state of a maximum field strength position of a microwave.

In more particular terms, as shown in FIG. 6, the orifice 41a is scanned relatively in a zigzag fashion with respect to the silicon wafer W. In this case, a relative speed of the orifice 41a with respect to the wafer is set beforehand so as to be approximately in inverse proportion to the thickness of a relatively thick portion Wa. By so doing, as shown in FIG. 7, the orifice 41a moves at a high speed $V_h$ just above a non-relatively thick portion Wb until arriving at a position above the relatively thick portion Wa, whereupon it slows down to a speed $V\lambda$ according to the thickness of the relatively thick portion Wa. As a result, the etching speed for the relatively thick portion Wa becomes longer, whereby the portion Wa is etched flat. In this way a local etching is performed successively throughout the whole surface of the silicon wafer W.

If there arises the necessity of cooling the quartz discharge tube 4 during or after the etching work, the operation of the microwave oscillator 1 is stopped and thereafter the cooling unit 8 shown in FIG. 1 is turned ON.

To be more specific, the valve 82 and the flow rate controller 83 in the cooling unit 8 are adjusted to supply a cooling gas, e.g., air to the quartz discharge tube 4 from the cylinder 81 at a flow rate in the range from 30 to 90 l/min. The cooling gas thus supplied flows so as to be diffused in the large-diameter portion 41 through the discharge portion 42 from the small-diameter portion 40 of the discharge tube 4 and undergoes an adiabatic expansion in the large-diameter portion. As a result, the temperature of the cooling gas drops to cool the discharge tube 4 effectively.

Thus, according to the local etching apparatus of this embodiment, even in the event of deviation of the maximum field strength position M1 of the microwave M, the formation of plasma is continued and the plasma formed becomes stable in a short time and is kept stable. Therefore, the plasma after ignition neither blinks nor vanishes and it is possible to obtain a stable plasma in a short time and that smoothly. As result, it is possible to improve the system reliability and the throughput and yield of the silicon wafer W.

Using the conventional straight, cylindrical discharge tube 100 and the tapered quartz discharge tube 4 of the invention, the inventor in the present case has conducted the following comparative experiment.

A microwave M with a power of 800 W and a frequency of 2.45 GHz was generated from the microwave oscillator 1, while from the cylinder 51 was supplied $SF_6$ gas to the quartz discharge tube 4 at a flow rate of 1 l/min. Then, the time ("stabilizing time" hereinafter) required from the beginning of plasma formation until reaching a stable state was evaluated in terms of the time required until power variations of the microwave M cease. As to the continuity of the stable state after the stabilization of plasma, it was evaluated in terms of the distance of movement ("stability continued distance" hereinafter) of the plunger 3 from the start of movement of the plunger until disappearance of plasma.

First, the above experiment was conducted using a conventional discharge tube 100 having an inside diameter of 30 mm. As a result, the stabilizing time was about 50 seconds and the stability continued distance was about 2 mm. The above experiment was also conducted using a conventional discharge tube 100 having an inside diameter of 36 mm to find that the stabilizing time was about 120 seconds and the stability continued distance was about 1 mm.

From these results it turned out that the conventional straight, cylindrical discharge tube 100 required several ten seconds until stabilization of plasma and that the time required until stabilization of plasma became longer with an increase in inside diameter of the discharge tube. It is also seen that the stability continued distance is as short as 1 to 2 mm and that only a slight shift of the plunger 3 due to thermal expansion results in disappearance of plasma. It also turned out that the conventional discharge tube 100 required a very long time until stabilization of plasma and that the plasma once formed might vanish in a short time after stabilization thereof.

Next, in the quartz discharge tube 4 of this embodiment, the inside diameter of the small-diameter portion 40 and that of the large-diameter portion 41 were set at 30 mm and 36 mm, respectively, to form a tapered discharge portion 42 expanding in inside diameter from 30 to 36 mm and having a length of 90 mm. Using this quartz discharge tube, the same experiment as above was conducted to find that the stabilizing time was about 3 seconds and that the stability continued distance was about 6 mm.

As is apparent from this result, according to the quartz discharge tube 4 of this embodiment, plasma becomes stable in only several seconds; besides, after the stabilization of plasma, it is not until movement a distance as long as 6 mm of the plunger 3 that the plasma vanishes. The plasma once ignited assumes a stable state in a short time with little blinking and the moving distance of the plunger 3 as expanded due to thermal expansion is about 1 to 3 mm, therefore, after the stabilization of plasma there substantially is no fear of plasma vanishing due to thermal expansion of the plunger 3. Further, it turned out that substantially the same effects as above were obtained when the taper angle θ of the discharge portion 42 (the angle between the axis of the discharge tube and the wall of the discharge portion 42) was in the range of between 1° and 10°.

Thus, the quartz discharge tube 4 proved to be extremely superior to the conventional discharge tube 100 in both the time required for reaching a stable state at the beginning of plasma formation and the continuity of the stable state after the formation of plasma.

Although in the above description quartz is used as the material of the discharge tube, there may be used, for example, aluminum oxide or aluminum nitride instead of quartz, even in which case there can be obtained the same effects as above.

Although the present invention has been described above in terms of a local etching apparatus with both etching area limiting unit 9 and cooling unit 8 incorporated therein, it goes without saying that those units are not always essential from the standpoint of stability of plasma after ignition.

Moreover, although $SF_6$ gas was shown above as the gas for producing the active species G, it may be substituted by, for example, $CF_4$ (carbon tetrafluoride) gas or $NF_3$ (nitrogen trifluoride) gas. Even a mixture of $SF_6$ gas with another gas, e.g., $O_2$ gas, is also employable. Further, as the cooling gas, $N_2$ gas may be used instead of air.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A discharge tube for a local etching apparatus wherein a microwave emitted from a microwave oscillator into a waveguide is reflected by a plunger to produce a standing wave of the microwave, said discharge tube is positioned within said standing wave, allowing gas contained in said discharge tube to be converted to plasma, and then an active species contained in the plasma is jetted to a workpiece from an orifice of said discharge tube to etch the workpiece locally, in which a discharge portion of said discharge tube positioned within said waveguide is formed in a tapered shape which is divergent toward the orifice side of said discharge tube.

2. A discharge tube for a local etching apparatus according to claim 1, wherein a taper angle between the inner wall of said discharge portion and the axis of the discharge tube is set at a value in the range of 1° to 10°.

3. A discharge tube for a local etching apparatus according to claim 1 or claim 2, wherein the material of the discharge tube is any one of quartz, aluminum oxide, and aluminum nitride.

4. A local etching apparatus comprising:

a microwave oscillator for generating a microwave;

a waveguide for propagation therethrough of the microwave generated from said microwave oscillator;

a plunger for reflecting the microwave propagated through said waveguide to generate a standing wave and for positioning a portion corresponding to a maximum field strength position of said standing wave at a predetermined position;

a tapered discharge tube inserted through said waveguide and having a discharge portion positioned within said waveguide, said discharge portion being tapered so as to be divergent toward an orifice side from which an active species is jetted; and a workpiece scanning means which causes said orifice of said discharge tube to scan relatively on a surface of a workpiece opposed to said orifice.

5. A local etching apparatus according to claim 4, further comprising:

a cooling means which cools said discharge tube by passing a cooling gas from small-diameter side toward large-diameter side.

6. A local etching apparatus according to claim 5, wherein said cooling gas is air or nitrogen, and when said discharge tube is to be cooled, said cooling gas is flowed at a flow rate in the range of 30 to 90 l/min.

7. A local etching apparatus according to any of claims 4 to 6, further comprising:

an etching area limiting means which forms a gaseous atmosphere held at a predetermined pressure so as to surround the active species jetted from said orifice toward the workpiece to prevent diffusion of the active species and which thereby limits an etching area for the workpiece by the active species to a smaller area than the area of the workpiece.

* * * * *